(12) United States Patent
Kumai et al.

(10) Patent No.: US 7,081,281 B2
(45) Date of Patent: Jul. 25, 2006

(54) POLYMERIZABLE LIQUID CRYSTAL COMPOUND, LIQUID CRYSTAL COMPOSITION AND OPTICAL ANISOTROPIC MATERIAL

(75) Inventors: Hiroshi Kumai, Koriyama (JP); Hiromichi Nagayama, Koriyama (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 11/351,011

(22) Filed: Feb. 10, 2006

(65) Prior Publication Data

US 2006/0124900 A1 Jun. 15, 2006

Related U.S. Application Data

(63) Continuation of application No. PCT/JP04/11560, filed on Aug. 11, 2004.

(30) Foreign Application Priority Data

Aug. 12, 2003 (JP) ............................. 2003-291935

(51) Int. Cl.
*C09K 19/38* (2006.01)
*C09K 19/30* (2006.01)
*C09K 19/20* (2006.01)
*C07C 69/76* (2006.01)
*C07C 69/767* (2006.01)

(52) U.S. Cl. ............. 428/1.1; 252/299.63; 252/299.67; 560/83; 560/85; 560/104; 560/128

(58) Field of Classification Search ................ 428/1.1; 252/299.63, 299.67; 560/85, 104, 128, 83
See application file for complete search history.

(56) References Cited

U.S. PATENT DOCUMENTS 5,858,268 A * 1/1999 Niiyama et al. ........ 252/299.01

FOREIGN PATENT DOCUMENTS

| JP | 10-195138 | 7/1998 |
|----|-----------|--------|
| JP | 2001-89529 | 4/2001 |

* cited by examiner

*Primary Examiner*—Shean C Wu
(74) *Attorney, Agent, or Firm*—Oblon, Spivak, McClleland, Maier, & Neustadt, P.C.

(57) ABSTRACT

The present invention provides a polymerizable liquid crystal compound having an excellent durability against blue laser light and having a small refractive index and small light absorption, a liquid crystal composition containing the compound, and an optical anisotropic material using the liquid crystal composition.

The polymerizable liquid crystal compound represented by the following formula (1), provided that $R^1$ is a hydrogen atom or a methyl group, Cy is a trans-1,4-cyclohexylene group, $X^1$ is a 1,4-phenylene group or a trans-1,4-cyclohexylene group, and $R^2$ is a $C_{1-8}$ alkyl group. The above 1,4-phenylene group and the trans-1,4-cyclohexylene group may be such that a hydrogen atom bonded to a carbon atom in each group may be substituted by a fluorine atom, a chlorine atom or a methyl group.

(1)

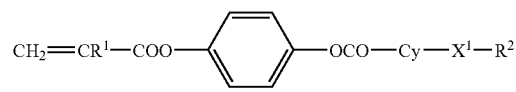

$$CH_2\!=\!CR^1\!-\!COO\!-\!\phantom{O}\!-\!OCO\!-\!Cy\!-\!X^1\!-\!R^2$$

10 Claims, 1 Drawing Sheet

POLYMERIZABLE LIQUID CRYSTAL COMPOUND, LIQUID CRYSTAL COMPOSITION AND OPTICAL ANISOTROPIC MATERIAL

BACKGROUND OF THE INVENTION

1. Field of the Invention

The present invention relates to a polymerizable liquid crystal compound which is useful for an optical element such as a diffraction element or a phase plate to be used for laser light having a wavelength of from 300 to 450 nm, a liquid crystal composition containing such a compound, and an optical anisotropic material using such a liquid crystal composition.

2. Discussion of Background

In recent years, in order to increase the capacity of an optical disk, blue shift of laser light to be employed for writing and reading of information is in progress. At present, laser light having a wavelength of 780 nm is used for CDs, and that of 660 nm is used for DVDs, but it has been studied to use laser light having a wavelength of from 300 to 450 nm for optical recording media of the next generation. Accordingly, an optical element such as a diffraction element or a phase plate to be used for laser light having a wavelength of from 300 to 450 nm (hereinafter referred to also as blue laser light), is required, and therefore, an optical anisotropic material useful for laser light in such a wavelength range is needed.

On the other hand, a liquid crystal having polymerizable functional groups (hereinafter referred to as a polymerizable liquid crystal compound) has both characteristics as a polymerizable monomer and characteristics as a liquid crystal. Accordingly, if the polymerization reaction is carried out after the polymerizable liquid crystal compound is aligned, it is possible to obtain an optical anisotropic material having such alignment of the liquid crystal fixed. Among such polymerizable liquid crystals, especially, a photopolymerizable liquid crystal having photopolymerizable functional groups is an excellent compound, from which an optical anisotropic material can easily be prepared by polymerization under irradiation with light.

The above optical anisotropic material has an optical anisotropy such as a refractive index anisotropy derived from a mesogen skeleton and is applied to an optical element such as a diffraction element or a phase plate by the use of such a characteristic. As such an optical anisotropic material, for example, a polymer liquid crystal has been reported which is obtained by polymerizing a liquid crystal composition containing a compound represented by the following formula (4):

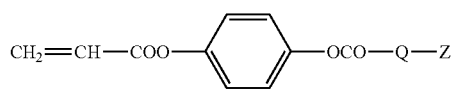

(4)

(wherein Q is a 1,4-phenylene group or a trans-1,4-cyclohexylene group, and Z is an alkyl group) (see Patent Document 1).

Further, the following properties may be mentioned as properties usually required for an optical anisotropic material for a phase plate or a diffraction element such as a polarizing hologram.

(1) Absorption of light to be used is low.
(2) The in-plane optical properties (such as the retardation value) are uniform.
(3) The optical properties can easily be adjusted to those of other materials constituting the element.
(4) The wavelength dispersion of the refractive index is small.
(5) The durability is good.

Patent Document 1: JP-A-H10-195138

SUMMARY OF THE INVENTION

Problems that the Invention is to Solve

However, conventionally known materials such as a polymer liquid crystal described in JP-A-H10-195138 had a problem that they are insufficient in durability against blue laser light.

Usually, in order to achieve downsizing and high efficiency of an element, a material having a high refractive index anisotropy is required. Further, the material having such a high refractive index anisotropy tends to have a high refractive index. Further, such a high refractive index material usually has the following characteristics:

(A) The wavelength dispersion of the refractive index is large.

Thus, there was a problem such that if oscillated wavelength of a light source is deviated from the initial setting, the transmittance decreases at the time of transmission of light and at the time of diffraction of light, the diffraction efficiency decreases due to generation of a high-order diffraction light.

(B) The refractive index increases along with blue shift of the light source.

Thus, there was a problem such that it becomes difficult to satisfy the above required property (3). Further, a material having large wavelength dispersion of the refractive index tends to show higher light absorption for light having a short wavelength (namely, the mol absorption coefficient of the material becomes large). Accordingly, a conventionally known high refractive index material was likely to absorb light having a short wavelength such as blue laser light and thus had a problem that the light stability is low.

As a result, conventional materials cannot satisfy the required properties for an optical anisotropic material for blue laser light, and particularly, there was a problem that the durability is insufficient.

Means of Solving the Problems

The present invention has been made to solve the above problems, and it provides a novel polymerizable liquid crystal compound satisfying the properties required for an optical anisotropic material and especially, having high durability against laser light having a wavelength of from 300 to 450 nm, a liquid crystal composition containing such a compound, and an optical anisotropic material using such a liquid composition. Namely, the present invention provides the following:

<1> A polymerizable liquid crystal compound which is an acrylic acid derivative represented by the following formula (1), provided that the symbols in the formula have the following meanings:

R$^1$: a hydrogen atom or a methyl group;
R$^2$: a C$_{1-8}$ alkyl group;
Cy: a trans-1,4-cyclohexylene group; and $X^1$: a 1,4-phenylene group or a trans-1,4-cyclohexylene group;

provided that the above 1,4-phenylene group and the trans-1,4-cyclohexylene group may be such that a hydrogen atom in each group may be substituted by a fluorine atom, a chlorine atom or a methyl group:

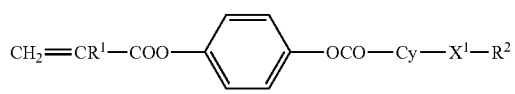
(1)

<2> The polymerizable liquid crystal compound according to <1>, wherein $R^1$ is a hydrogen atom.

<3> A liquid crystal composition comprising two or more polymerizable liquid crystal compounds as defined in <1> or <2>.

<4> A liquid crystal composition comprising a polymerizable liquid crystal compound as defined in <1> or <2> and a polymerizable liquid crystal compound which is an acrylic acid derivative represented by the following formula (2), provided that the symbols in the formula have the following meanings:

$R^3$: a hydrogen atom or a methyl group;
Cy: a trans-1,4-cyclohexylene group, provided that a hydrogen atom in the group may be substituted by a fluorine atom, a chlorine atom or a methyl group; and
$R^4$: a $C_{1-8}$ alkyl group:

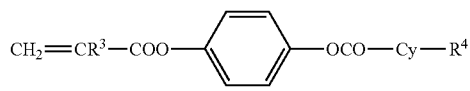
(2)

<5> A liquid crystal composition comprising a polymerizable liquid crystal compound as defined in <1> or <2>, and a polymerizable liquid crystal compound which is an acrylic acid derivative represented by the following formula (3), provided that the symbols in the formula have the following meanings:

$CH_2=CR^5-COO-Cy-Cy-R^6$ (3)

$R^5$: a hydrogen atom or a methyl group;
Cy: a trans-1,4-cyclohexylene group, provided that a hydrogen atom in the group may be substituted by a fluorine atom, a chlorine atom or a methyl group; and
$R^6$: a $C_{1-8}$ alkyl group:

<6> The liquid crystal composition according to any one of <3> to <5>, wherein the total content of the polymerizable liquid crystal compounds is from 25 to 100 mass %, based on the entire liquid crystal composition.

<7> An optical anisotropic material obtained by polymerizing the liquid crystal composition as defined in any one of <3> to <6> in an aligned state under irradiation of ultraviolet light or visible light.

<8> An optical element made of the optical anisotropic material as defined in <7>.

<9> The optical element according to <8>, which is a diffraction element.

<10> The optical element according to <8>, which is a phase plate.

EFFECT OF THE INVENTION

According to the present invention, it is possible to obtain an optical anisotropic material having high durability against laser light having a wavelength of from 300 to 450 nm.

DETAILED DESCRIPTION OF THE PREFERRED EMBODIMENTS

Figure 1:
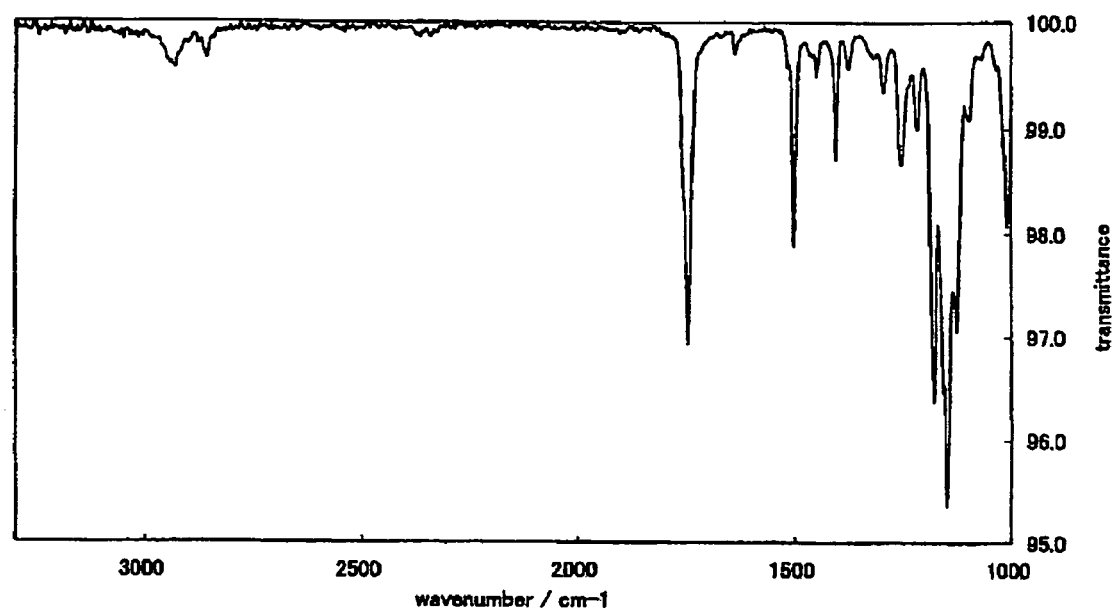
FIG. 1 is a graph showing an infrared absorption spectrum of the compound (1A-a3) in Example 1.

In the present specification, a polymerizable liquid compound represented by the formula (1) will also be referred to as a compound (1). The same applies to other compounds. Further, with respect to the wavelength, even if one point is described, such a point is meant to cover the range of the described value ±5 nm.

The polymerizable liquid crystal compound of the present invention is a compound represented by the following formula (1).

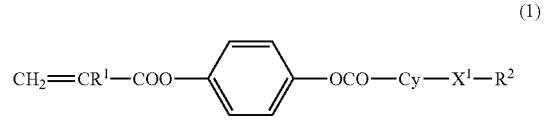
(1)

$R^1$ in the formula (1) is a hydrogen atom or a methyl group and is preferably a hydrogen atom. If $R^1$ is a hydrogen atom, the polymerization reaction readily proceeds when the after-mentioned liquid crystal composition containing the compound (1), is subjected to photopolymerization to obtain an optical anisotropic material, such being preferred. Further, the properties as an optical anisotropic material are less susceptible to an influence of the external environment such as the temperature, and therefore, there is also an advantage such that the in-plane distribution of the retardation is small.

$R^2$ is a $C_{1-8}$ alkyl group and is preferably a $C_{2-6}$ alkyl group.

In the compound (1), if the number of carbon atoms in $R^2$ is too large, the crystal-nematic phase transition point of the compound (1) will be high, whereby the crystal-nematic phase transition point of the liquid crystal composition containing the compound (1) also tends to be high. In order to bring the crystal-nematic phase transition point of the liquid crystal composition to at most room temperature (namely, in order for the liquid crystal composition to show a nematic phase at a temperature of from room temperature to a super cooling state), the number of carbon atoms in $R^2$ is preferably within the above range. Further, $R^2$ preferably has a straight-chain structure, from the viewpoint that it is thereby possible to broaden the temperature range wherein the compound (1) shows the liquid crystallinity.

Cy is a trans-1,4-cyclohexylene group.
$X^1$ is a 1,4-phenylene group or a trans-1,4-cyclohexylene group. If $X^1$ is a 1,4-phenylene group, among three ring groups contained in the compound (1), two are 1,4-phenylene groups. Accordingly, such a compound is stable against blue laser light, as compared with the compound in which all the three ring groups are 1,4-phenylene groups, and the optical anisotropy such as the refractive index anisotropy, will be large as compared with the compound having only one 1,4-phenylene group. Accordingly, a desired optical anisotropy can readily be obtained even when a liquid crystal composition for a diffraction element which requires a particularly large retardation value is prepared. Further, the degree of freeness for preparing a liquid crystal composition also becomes high. When $X^1$ is a trans-1,4-cyclohexylene group, the stability of the compound (1) against blue laser light can further be improved, and the nematic phase-isotropic phase transition point can be made higher.

In the compound (1), the 1,4-phenylene group or the trans-1,4-cyclohexylene group may be an unsubstituted group, or a hydrogen atom bonded to the carbon atom of the group may be substituted by a fluorine atom, a chlorine atom or a methyl group. From the viewpoint that the nematic phase-isotropic phase transition point of the compound (1) can be increased, an unsubstituted group is preferred.

The compound (1) is preferably the following compound (1A), wherein $R^1$ is a hydrogen atom.

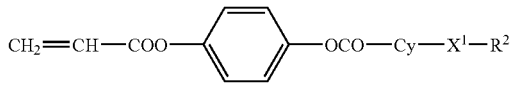

(1A)

As specific examples of the compound (1), the following compounds may be mentioned. Among them, the following compounds (1A-a2) to (1A-a6) and the following compounds (1A-b2) to (1A-b6) are preferred. In the following, Cy is as defined above. Ph is a 1,4-phenylene group, and a hydrogen atom in such a group may be substituted by a chlorine atom, a fluorine atom or a methyl group. Cy and Ph are preferably unsubstituted groups. Further, when an alkyl group in the following formulae has structurally isomeric groups, it includes all such groups, and it is preferably a straight-chain alkyl group.

| | |
|---|---|
| $CH_2$=CH—COO—Ph—OCO—Cy—Ph—$CH_3$ | (1A-a1) |
| $CH_2$=CH—COO—Ph—OCO—Cy—Ph—$C_2H_5$ | (1A-a2) |
| $CH_2$=CH—COO—Ph—OCO—Cy—Ph—$C_3H_7$ | (1A-a3) |
| $CH_2$=CH—COO—Ph—OCO—Cy—Ph—$C_4H_9$ | (1A-a4) |
| $CH_2$=CH—COO—Ph—OCO—Cy—Ph—$C_5H_{11}$ | (1A-a5) |
| $CH_2$=CH—COO—Ph—OCO—Cy—Ph—$C_6H_{13}$ | (1A-a6) |
| $CH_2$=CH—COO—Ph—OCO—Cy—Ph—$C_7H_{15}$ | (1A-a7) |
| $CH_2$=CH—COO—Ph—OCO—Cy—Ph—$C_8H_{17}$ | (1A-a8) |
| $CH_2$=CH—COO—Ph—OCO—Cy—Cy—$CH_3$ | (1A-b1) |
| $CH_2$=CH—COO—Ph—OCO—Cy—Cy—$C_2H_5$ | (1A-b2) |
| $CH_2$=CH—COO—Ph—OCO—Cy—Cy—$C_3H_7$ | (1A-b3) |
| $CH_2$=CH—COO—Ph—OCO—Cy—Cy—$C_4H_9$ | (1A-b4) |
| $CH_2$=CH—COO—Ph—OCO—Cy—Cy—$C_5H_{11}$ | (1A-b5) |
| $CH_2$=CH—COO—Ph—OCO—Cy—Cy—$C_6H_{13}$ | (1A-b6) |
| $CH_2$=CH—COO—Ph—OCO—Cy—Cy—$C_7H_{15}$ | (1A-b7) |
| $CH_2$=CH—COO—Ph—OCO—Cy—Cy—$C_8H_{17}$ | (1A-b8) |
| $CH_2$=C($CH_3$)—COO—Ph—OCO—Cy—Ph—$CH_3$ | (1B-a1) |
| $CH_2$=C($CH_3$)—COO—Ph—OCO—Cy—Ph—$C_2H_5$ | (1B-a2) |
| $CH_2$=C($CH_3$)—COO—Ph—OCO—Cy—Ph—$C_3H_7$ | (1B-a3) |
| $CH_2$=C($CH_3$)—COO—Ph—OCO—Cy—Ph—$C_4H_9$ | (1B-a4) |
| $CH_2$=C($CH_3$)—COO—Ph—OCO—Cy—Ph—$C_5H_{11}$ | (1B-a5) |
| $CH_2$=C($CH_3$)—COO—Ph—OCO—Cy—Ph—$C_6H_{13}$ | (1B-a6) |
| $CH_2$=C($CH_3$)—COO—Ph—OCO—Cy—Ph—$C_7H_{15}$ | (1B-a7) |
| $CH_2$=C($CH_3$)—COO—Ph—OCO—Cy—Ph—$C_8H_{17}$ | (1B-a8) |
| $CH_2$=C($CH_3$)—COO—Ph—OCO—Cy—Cy—$CH_3$ | (1B-b1) |
| $CH_2$=C($CH_3$)—COO—Ph—OCO—Cy—Cy—$C_2H_5$ | (1B-b2) |
| $CH_2$=C($CH_3$)—COO—Ph—OCO—Cy—Cy—$C_3H_7$ | (1B-b3) |
| $CH_2$=C($CH_3$)—COO—Ph—OCO—Cy—Cy—$C_4H_9$ | (1B-b4) |
| $CH_2$=C($CH_3$)—COO—Ph—OCO—Cy—Cy—$C_5H_{11}$ | (1B-b5) |
| $CH_2$=C($CH_3$)—COO—Ph—OCO—Cy—Cy—$C_6H_{13}$ | (1B-b6) |
| $CH_2$=C($CH_3$)—COO—Ph—OCO—Cy—Cy—$C_7H_{15}$ | (1B-b7) |
| $CH_2$=C($CH_3$)—COO—Ph—OCO—Cy—Cy—$C_8H_{17}$ | (1B-b8) |

The compound (1) of the present invention can be prepared by e.g. the following method.

The preparation method of the above compound (1A) may be the following method. Namely, it may be a method for obtaining the compound (1A) by reacting the following compound (a) and an acrylic acid chloride (b) to obtain the following compound (c), and then reacting the compound (c) and the following compound (d) (provided that Cy, $X^1$ and $R^2$ are as defined above).

(a)

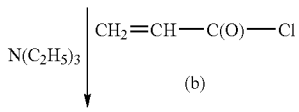

(b)

-continued

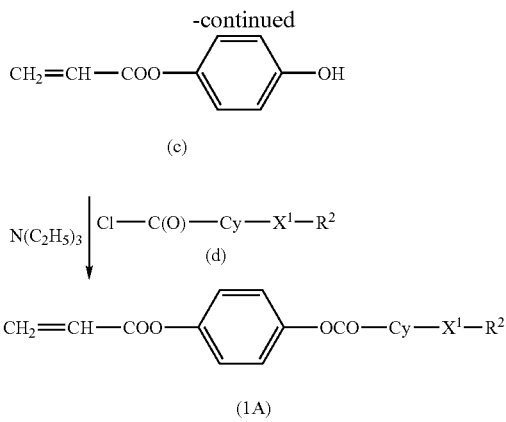

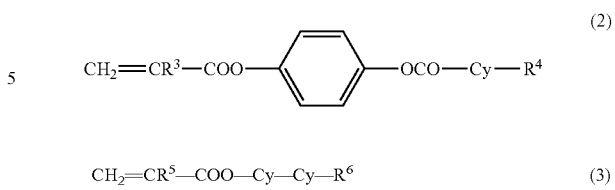

wherein each of $R^3$ and $R^5$ which are independent of each other is a hydrogen atom or a methyl group and is preferably a hydrogen atom. Each of $R^4$ and $R^6$ which are independent of each other is a $C_{1-8}$ alkyl group and is preferably a $C_{2-6}$ straight-chained alkyl group. Cy is as defined above and is preferably an unsubstituted group.

In a case where the liquid crystal composition of the present invention contains at least two compounds (1), it is preferred to contain at least two compounds having the same mesogen structure portions and being different in the number of carbon atoms in $R^2$. Particularly, such a liquid composition preferably contains at least one member selected from the compounds wherein $R^2$ is a $C_{2-4}$ straight-chained alkyl group and at least one member selected from the compounds wherein $R^2$ is a $C_{5-8}$ straight-chained alkyl group, and it particularly preferably contains a compound wherein $R^2$ is a n-propyl group and a compound wherein $R^2$ is a n-pentyl group.

The proportion of the total content of the compound (1), the compound (2) and the compound (3) contained in the liquid crystal composition is from 25 to 100 mass %, preferably from 40 to 100 mass %, particularly preferably from 60 to 100 mass % based on the entire liquid crystal composition. If the above proportion becomes high, the wavelength dispersion of the refractive index will be small, and the stable retardation value can be obtained.

In the case where the liquid crystal composition of the present invention contains the compound (2) and/or the compound (3) in addition to the compound (1), the content of the compound (1) is preferably from 40 to 100 mol %, more preferably from 70 to 100 mol %, based on the entire polymerizable liquid crystal compound. The total content of the compound (2) and the compound (3) is preferably at most 60 mol %, particularly preferably at most 30 mol %, based on the entire polymerizable liquid crystal compound. Further, if the compound (2) is used alone, the durability against blue laser light is likely to be insufficient, and therefore, in the case of using the compound (2), the proportion of the compound (2) contained in the entire polymerizable liquid crystal compound is preferably at most 50 mol %.

The liquid crystal composition of the present invention may contain other compounds other than the compound (1), the compound (2) and the compound (3). Such other compounds are preferably selected depending on the particular use, required properties, etc. For example, it is possible to suitably incorporate a component showing liquid crystallinity at a low temperature, a low viscosity component for a low temperature, a component for adjusting the absolute refractive index or refractive index anisotropy, a component for improving the dielectric constant anisotropy, a component to impart the cholesteric property, a polymerizable or non-polymerizable light stabilizer, and other various additives.

Among light stabilizers, the polymerizable light stabilizer may, for example, be the following compound (A) (manufactured by ASAHI DENKA CO., LTD., product ID number: LA87) or the following compound (B) (manufactured by The compound (1) of the present invention has good durability against blue laser light, which is derived from the structure having three ring groups. Further, such a compound (1) has no —Ph—CO— structure and has —Cy— as a cyclic saturated hydrocarbon group which absorbs no light even in a short wavelength region of at most 400 nm, whereby the light absorption in the wavelength zone of blue laser light is small. Further, such a compound (1) has a —Ph— structure (Ph represents a 1,4-phenylene group), whereby it is possible to develop relatively large optical anisotropy such as refractive index anisotropy. Further, in many cases, a material having large refractive index anisotropy tends to have a large refractive index and refractive index wavelength dispersion. Whereas the compound (1) has a merit in that the increase in the refractive index in the wavelength region (300 to 450 nm) of blue laser light can be thereby suppressed and the refractive index wavelength dispersion is thereby small.

Accordingly, by the use of the compound (1), sufficient light stability can be obtained against blue laser light, and an optical anisotropic material excellent in the properties such as the phase difference can be provided.

Now, the liquid crystal composition containing the compound (1) will be described. The compound (1) shows a sufficiently broad liquid crystal temperature range by itself and has such a characteristic that the temperature range showing a liquid crystal phase is broad particularly to a high temperature side. However, so as to show liquid crystallinity also in a low temperature side, it is preferred that the compound (1) is mixed with other polymerizable liquid crystal compounds to prepare a liquid crystal composition having desired properties. By the use of a plurality of polymerizable liquid crystal compounds in combination, the crystal-nematic phase transition point of the liquid crystal composition will decrease, whereby such a composition can be handled in the state of a liquid crystal phase or an isotropic phase without using a high temperature equipment.

The liquid crystal composition of the present invention may be a composition containing at least two compounds (1), or may be a composition containing the compound (1) and another polymerizable liquid crystal compound other than the compound (1). Such another polymerizable liquid crystal compound is preferably an acrylic acid derivative, and the following compound (2) or the following compound (3) is preferred:

ASAHI DENKA CO., LTD., product ID number: LA82). The non-polymerizable light stabilizer may, for example, be LA62 or LA67 manufactured by ASAHI DENKA CO., LTD., as well as the following compound (C) (manufactured by ASAHI DENKA CO., LTD., product ID number: LA77).

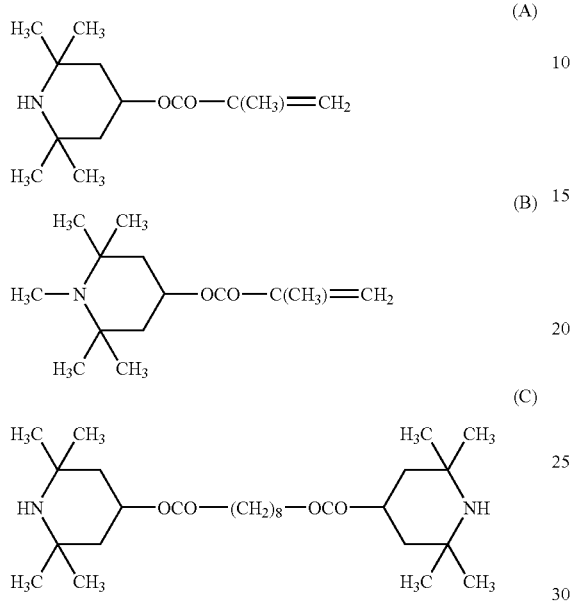

The durability against blue laser light can be improved by adding such a light stabilizer in such an amount that the properties of an optical anisotropic material are not impaired. Such an amount of the light stabilizer is preferably from 0.2 to 2 mass % based on the entire liquid crystal composition.

Said other compounds may be any of a polymerizable liquid crystal compound, a polymerizable non-liquid crystal compound, a non-polymerizable liquid crystal compound and a non-polymerizable non-liquid crystal compound other than the compound (1), the compound (2) and the compound (3), and they may be used alone or in combination as a mixture. When such other compounds are polymerizable liquid crystal compounds having high durability against blue laser light, other than the compound (1), the compound (2) and the compound (3), their proportion in the liquid crystal composition is preferably at most 60 mol %, more preferably at most 25 mol %, based on the entire polymerizable liquid crystal compound. Further, the proportion of the total content of the polymerizable non-liquid crystal compound, the non-polymerizable liquid crystal compound and the non-polymerizable non-liquid crystal compound is preferably at most 10 mass %, particularly preferably at most 5 mass %, based on the liquid crystal composition.

As the polymerizable liquid crystal compound other than the compound (1), the compound (2) and the compound (3), the compound containing no —Ph—CO— structure is preferred because of high durability against blue laser light, and particularly, the following compounds may be exemplified. $R^7$ in the formulae represents a $C_{1-8}$ alkyl group. When the alkyl group has structural isomers, such a group includes all the structural isomers and is preferably a group having a straight-chained structure. Cy and Ph are as defined above, and each of them is preferably an unsubstituted group.

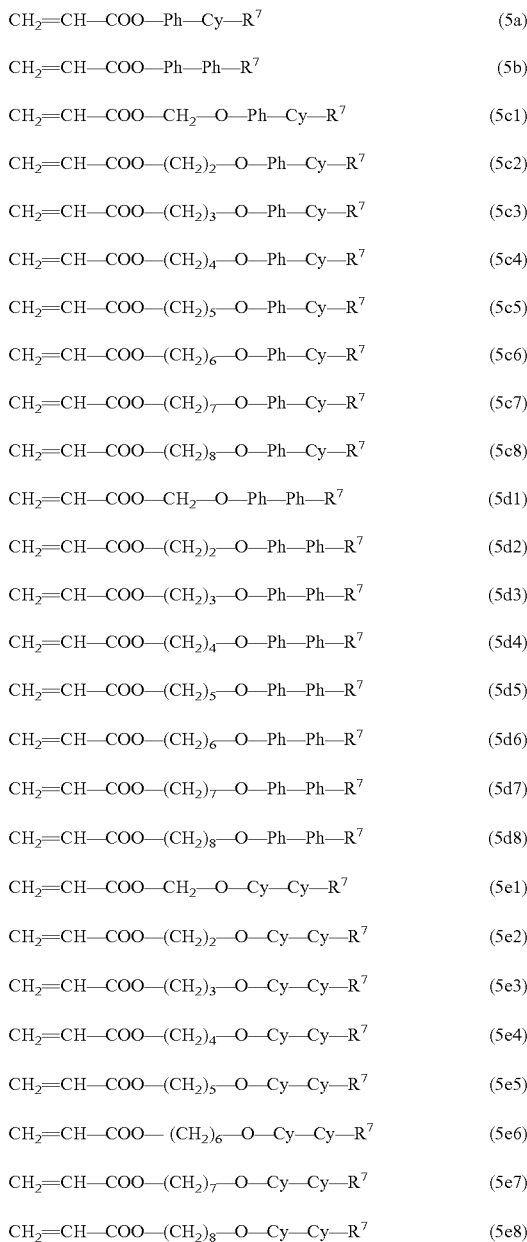

These dicyclic compounds are excellent in mutual solubility with other liquid crystal materials. Further, the compounds (5c1) to (5c8) have a good balance between the value of the refractive index anisotropy and the temperature range showing a liquid crystal phase. The compounds (5d1) to (5d8) have such an advantage that their refractive index anisotropy is relatively high, and the compounds (5e1) to (5e8) have such an advantage that the temperature range showing a liquid crystal phase is wide.

Now, the optical anisotropic material of the present invention will be described.

The optical anisotropic material of the present invention can be obtained by polymerizing the above liquid crystal composition. The polymerization method may, for example, be a photopolymerization method or a heat polymerization method and is preferably a photopolymerization method. The light to be used for the photopolymerization method is preferably ultraviolet light or visible light. In the case of photopolymerization, a photopolymerization initiator may be used to carry out the polymerization efficiently. As such a photopolymerization initiator, acetophenones, benzophenones, benzoins, benzyls, Michler ketones, benzoin alkyl ethers, benzyl dimethyl ketals or thioxanetones may preferably be used. Such photopolymerization initiators may be used alone or in combination as a mixture of two or more of them. The amount of the photopolymerization initiator to be used, is preferably from 0.1 to 10 mass %, particularly preferably from 0.3 to 2 mass %, based on the entire liquid crystal composition.

In the polymerization method such as the photopolymerization method, it is preferred that the above liquid crystal composition is polymerized in an aligned state. In this specification, "polymerized in an aligned state" means that the polymerization is carried out in such a state that the above liquid crystal composition is sandwiched between supports, the liquid crystal composition shows a liquid crystal phase and the liquid crystal is aligned.

The supports for the polymerizable liquid crystal composition are preferably supports having alignment treatment applied to substrates of glass or plastic. Such alignment treatment may be carried out by directly rubbing the substrate surface with e.g. a natural fiber such as cotton or wool, or a synthetic fiber such as nylon or polyester, or may be carried out by laminating a polyimide alignment film on the substrate surface and then rubbing the alignment film surface with e.g. the above fibers.

Then, spacers such as glass beads are placed on the surface of the support on which alignment treatment has been applied, and a plurality of such supports are disposed to face each other with a desired space to prepare a cell. Then, the above liquid crystal composition is filled inbetween the supports constituting the cell, and the polymerization reaction is carried out.

In order to keep the state where the liquid crystal composition shows a liquid crystal phase, the temperature of the atmosphere may be kept to be at least the crystal-nematic phase transition point and at most the nematic phase-isotropic phase transition temperature ($T_c$), but the refractive index anisotropy of the liquid crystal composition is extremely small at a temperature in the vicinity of $T_c$. Therefore, the upper limit of the temperature of the atmosphere is preferably at most $(T_c-10)°$ C.

The optical anisotropic material prepared by the above method may be used as it is disposed inbetween the supports, or it may be peeled from the supports and supported on other substrates.

The optical anisotropic material of the present invention has high durability against blue laser light and thus is useful for an optical element such as a diffraction element (such as a polarizing hologram) or a phase plate for blue laser light. As a polarizing hologram, there may, for example be a case wherein signal lights due to the reflection of lights, (emitted from a laser light source originally,) from an information recorded surface of an optical disc, are separated and then introduced into a photo-receiving element. As a phase plate, there may be a case wherein it is used as a half wavelength plate, to control the phase difference of the light emitted from a laser light source, or case wherein it is installed as a quarter wavelength plate in an optical path to stabilize the output of the laser light source.

EXAMPLES

Now, the present invention will be described in detail with reference to Examples and Comparative Examples. Further, the refractive index anisotropy is referred to simply as Δn. Further, in the after-mentioned Examples, Irgacure 907 manufactured by Ciba Specialty Chemicals K.K. was used as a photopolymerization initiator. Examples 1 to 7 are Examples of the present invention and Example 8 is Comparative Example.

Example 1

Preparation Example for Compound (1A-a3)

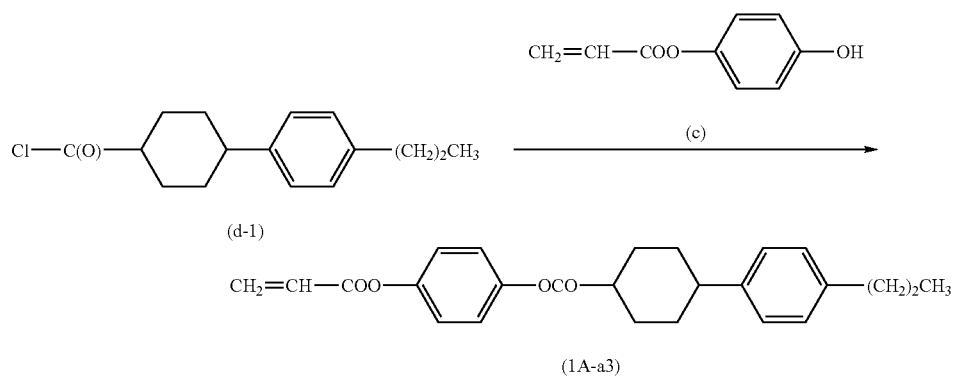

Into a mixture of a compound (d-1) (4.4 g, 0.017 mol), dichloromethane (70 mL) and triethylamine (2.5 g, 0.025 mol), a compound (c) (2.7 g, 0.017 mol) was added under cooling with ice water so that the temperature of the reaction solution would not exceed 20° C. After stirring for 24 hours, a mixture of concentrated hydrochloric acid (2 mL), ice (20 g) and water (30 mL) was added to the reaction solution. An organic layer was separated, and a saturated sodium chloride aqueous solution (40 mL) was added thereto to carry out liquid separation. The organic layer was separated again and washed with water, and then dried over anhydrous magnesium sulfate, followed by filtration under reduced pressure.

The filtrate was purified by means of column chromatography (developing solvent: dichloromethane/toluene). The fraction containing the desired product was concentrated to obtain a crystal powder. To this crystal powder, a mixed solvent (90 mL) of dichloromethane and ethanol was added, and recrystallization was carried out to obtain a compound (1A-a3) (3.4 g). The yield was 52%.

The compound (1A-a3) had a transition temperature from crystal to a nematic phase of 113° C. and a transition temperature from a nematic phase to an isotropic phase of 198° C. (extrapolation value), and Δn against laser light with a wavelength of 589 nm at 50° C. was 0.18 (extrapolation value).

The infrared absorption spectrum of the compound (1A-a3) is shown in FIG. 1. Further, the result of measurement of the $^1$HNMR spectrum of the compound (1A-a3) is shown as follows.

$^1$HNMR (solvent: CDCl$_3$, internal standard: TMS) δ (ppm) 0.9 (triplet, 3H), 1.4–1.8 (m, 6H), 2.0–2.7 (Complex, m, 8H), 5.9–6.7 (m, 3H), 7.0–7.2 (s, 8H).

Example 2

Preparation Example for Compound (1A-a5)

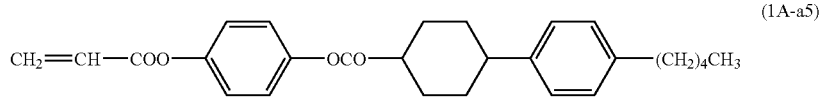
(1A-a5)

The reaction was carried out in the same manner as in Example 1 except that the compound (d-1) was changed to the following compound (d-2), to obtain a compound (1A-a5) (5.04 g). The yield was 70.5%.

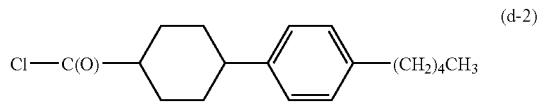
(d-2)

Figure 2:
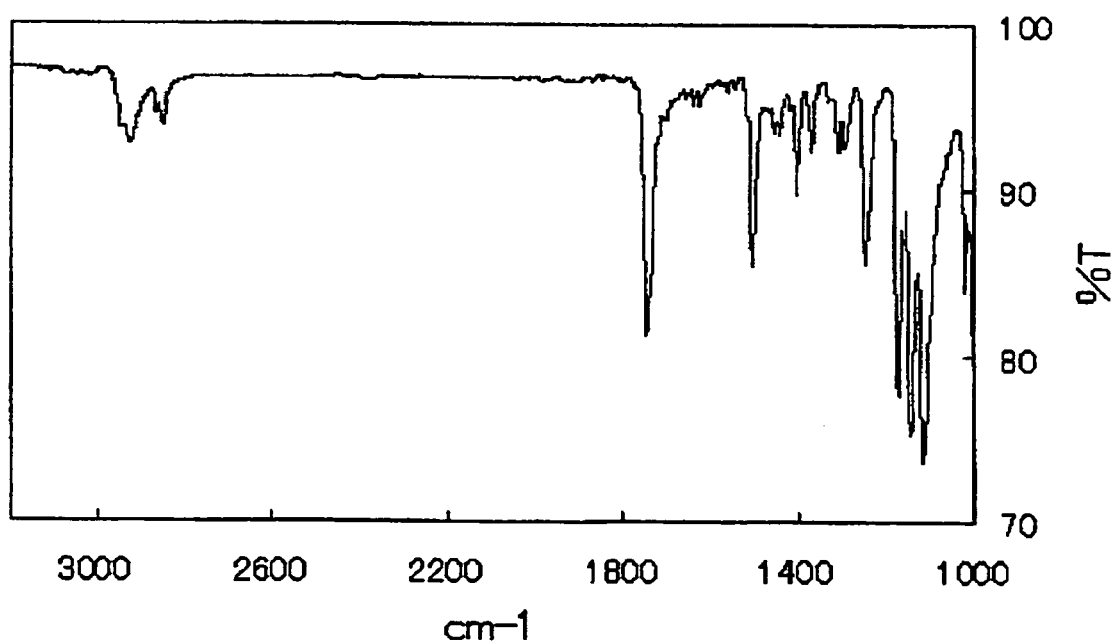
FIG. 2 is a graph showing an infrared absorption spectrum of the compound (1A-a5) in Example 2.

The compound (1A-a5) had a transition temperature from crystal to a nematic phase of 72.3° C. and a transition temperature from a nematic liquid phase to an isotropic phase of 210.9° C. (extrapolation value). The infrared absorbance spectrum of the compound (1A-a5) is shown in FIG. 2. The result of measurement of the $^1$HNMR spectrum of the compound (1A-a5) is shown as follows.

$^1$HNMR (solvent: CDCl$_3$, internal standard: TMS) δ (ppm) 0.9 (triplet, 3H), 1.4–1.8 (m, 10H), 2.0–2.7 (Complex, m, 8H), 6.0–6.7 (m, 3H), 7.0–7.2 (s, 8H).

Example 3

Example 3-1

Formulation Example (1) for Liquid Crystal Composition

The compound (1A-a3) obtained in Example 1 and the following compound (2-5) were mixed in a ratio of 1:1 (molar ratio) to prepare a liquid crystal composition A.

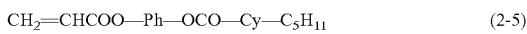
CH$_2$=CHCOO—Ph—OCO—Cy—C$_5$H$_{11}$ (2-5)

The liquid crystal composition A showed a nematic phase in a range of from room temperature to a super cooling state. Further, the phase transition temperature from the nematic phase to an isotropic phase was at least 154° C.

Then, a photopolymerization initiator was added to the liquid crystal compositions A in proportions of 0.5 mass % and 1.0 mass % to such liquid crystal compositions A to obtain a liquid crystal composition A1 and a liquid crystal composition A2, respectively.

Example 3-2

Production Example (1) for Optical Element

Two glass plates of 5 cm×5 cm×0.5 mm were coated with a polyimide solution as an aligning agent by spin-coating and dried, and then were subjected to rubbing treatment in a predetermined direction with a nylon cloth, to prepare supports. The two supports were bonded to each other by use of an adhesive agent so that the surfaces which were treated for alignment, faced each other, whereby a cell was prepared. Glass beads were added to the adhesive agent so that the space between the supports was adjusted to 4 μm.

Then, the liquid crystal composition A1 obtained in Example 3-1 was injected into the cell at 100° C. Photopolymerization was conducted under the irradiation with ultraviolet light with an intensity of 80 mW/cm$^2$ at 80° C. so that the total amount of light was 5,300 mJ/cm$^2$, whereby a layer of an optical anisotropic material was formed to obtain an optical element A1. The optical isotropic material was horizontally aligned in the rubbing direction. Such an optical element A1 was transparent in the visible range, and no scattering was observed. Further, Δn against laser light having a wavelength of 589 nm was 0.055.

Example 3-3

Evaluation Example (1) of Optical Element

The optical element A1 obtained in Example 3-1 was is irradiated with a Kr laser (wavelength: 407 nm, multimode: 413 nm) at a temperature of 25° C. so that the total exposure energy was 20 W·hour/mm$^2$, to carry out an accelerated exposure test with blue laser light. The refractive index anisotropy of the exposed surface after the test was measured, and the decrease in Δn after the test relative to Δn before the test was less than 1%.

Thus, the optical element A1 was found to be excellent in durability against blue laser light.

Example 3-4

Production Example (1) of Polarizing Hologram for Optical Head

A glass plate having a rectangular lattice with a pitch of 9 μm and a depth of 3 μm was coated with a polyimide as an aligning agent by spin-coating and was subjected to thermal treatment. It was then subjected to rubbing treatment with a nylon cloth in a direction parallel with the lattice to prepare a support. Glass plates which were subjected to the same alignment treatment were bonded to each other by use of an adhesive agent so that the surfaces treated for alignment faced each other, whereby a cell was prepared. When preparing the cell, such glass plates were adjusted so that the alignment directions were in parallel.

The liquid crystal composition A2 obtained in Example 3-1 was injected into such a cell at 100° C. Photopolymerization was then conducted under the irradiation with ultraviolet light with an intensity of 40 mW/cm$^2$ at 90° C. for 3 minutes. On one side of this cell, a quarter wavelength plate was laminated to prepare a polarizing hologram beam splitter. Such an element was used for an optical head, and it was possible to obtain 27% of a utilization efficiency of light against laser light having a wavelength of 650 nm.

Example 4

Example 4-1

Formulation Example (2) of Liquid Crystal Composition

The compound (1A-a3) obtained in Example 1 and the compound (1A-a5) obtained in Example 2 were mixed in a ratio of 1:1 (molar ratio) to obtain a liquid crystal composition B. The liquid crystal composition B showed a nematic phase in a range of from room temperature to a super cooling state. Further, the phase transition temperature from the nematic phase to an isotropic phase was at least 200° C.

Then, to the liquid crystal composition B, a photopolymerization initiator was added in an amount of 0.5 mass % based on the liquid crystal composition B to obtain a liquid crystal composition B1.

Example 4-2

Production Example (2) of Optical Element

A cell was prepared in the same manner as in Example 3-2 except that the space between supports was adjusted to 3.2 μm. The liquid crystal composition B1 was injected into the cell at 100° C. Then, photopolymerization was conducted under the irradiation with ultraviolet light with an intensity of 60 mW/cm$^2$ at 700C so that the total amount of light was 5,000 mJ/cm$^2$, and a layer of an optical anisotropic material was formed to obtain an optical element B1. The optical anisotropic material was horizontally aligned in the rubbing direction. The optical element B1 was transparent in a visible range, and no scattering was observed. Further, Δn against laser light having a wavelength of 589 nm was 0.07.

Example 4-3

Evaluation Example (2) of Optical Element

The optical element B1 obtained in Example 4-2 was subjected to an accelerated exposure test by blue laser light in the same manner as in Example 3-3 except that the total exposure energy was 26 W·hour/mm$^2$. As a result, the decrease in Δn after the acceleration test relative to Δn before the test was less than 1%, and the optical element B1 was found to be excellent in durability against blue laser light.

Example 4-4

Production Example (2) of Polarizing Diffraction Element

A cell was prepared in the same manner as in Example 3-2 except that a glass plate having a reflection preventing film for blue light laminated was used as the glass plate and the space between the supports was adjusted to 1 μm. The liquid crystal composition B1 was injected into the cell, and the photopolymerization reaction was carried out to form a layer of an optical anisotropic material. Then, one of the supports was peeled, and the above optical anisotropic material was subjected to photoisography and dry etching to form a rectangular structure having a pitch of 20 μm and a depth of 1 μm. In such a rectangular recess, a transparent resin (a transparent resin having the same refractive index as the ordinary index of the optical anisotropic material) having a refractive index of 1.57 against laser light having a wavelength of 405 nm was filled. Then, a glass plate having a reflection preventing film for blue light laminated was superposed on the layer of the optical anisotropic material, and their peripheries were bonded to each other by using an adhesive agent, whereby an optical element B2 was prepared. Laser light having a wavelength of 405 nm was introduced into the optical element B2 perpendicularly to the substrate, to obtain a polarizing diffraction element, whereby with an ordinary light, at least 97% of 0 order light was transmitted (about 0.5% of 1 order light transmits) therethrough and with extraordinary light, the ratio of the 1 order light/0 order light was 11.

Example 5

Example 5-1

Formulation Example (3) of a Liquid Crystal Composition

The compound (1A-a3) obtained in Example 1, the compound (1A-a5) obtained in Example 2, the following compound (3-A-3) and the following compound (3-A-5) were mixed in a ratio (molar ratio) of 1:1:1:1 to obtain a liquid crystal composition C. The liquid crystal composition C showed a nematic phase in a range of from room temperature to a super cooling state. Further, the phase transition temperature from the nematic phase to an isotropic phase was found to be 140° C.

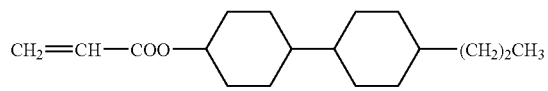

(3-A-3)

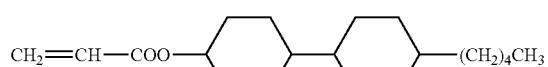

(3-A-5)

Then, to the liquid crystal composition C, a photopolymerization initiator was added in an amount of 0.5 mass % based on the liquid crystal composition C to obtain a liquid crystal composition C1.

Example 5-2

Production Example (3) of Optical Element

A cell was prepared in the same manner as in Example 3-2 except that the space between the supports was adjusted to 4.7 μm. Into such a cell, the liquid crystal composition C1 obtained in Example 5-1 was injected at 70° C. Then, at 600C, photopolymerization was conducted under the irradiation with ultraviolet light having an intensity of 50 mW/cm$^2$ at 60° C. so that the total amount of light was 4,500 mJ/cm$^2$, whereby a layer of an optical anisotropic material was formed to obtain an optical element C. The optical anisotropic material was horizontally aligned in the rubbing direction of the substrate. Such an optical element C was transparent in the visible range and no scattering was observed. Further, Δn against laser light having a wavelength of 589 nm was 0.03.

Example 5-3

Evaluation Example (3) of Optical Element

The optical element C obtained in Example 5-2 was subjected to an accelerated exposure test by blue laser light in the same manner as in Example 3-3 except that the total exposure energy was 40 W·hour/mm$^2$. As a result, the decrease in Δn after the accelerated test relative to Δn before the test was found to be less than 1%, and the optical element C was found to be excellent in durability against blue laser light.

Example 6

Example 6-1

Formulation Example (4) of Liquid Crystal Composition

The compound (1A-a3) obtained in Example 1, the compound (1A-a5) obtained in Example 2, the following compound (3-A-3) and the following compound (3-A-5) were mixed in a ratio (molar ratio) of 4:4:1:1 to obtain a liquid crystal composition D. The liquid crystal composition D showed a nematic phase in a range of from room temperature to a super cooling state. Further, the phase transition temperature from the nematic phase to an isotropic phase was found to be at least 148° C.

Then, to the liquid crystal composition D, a photopolymerization initiator was added in an amount of 0.5 mass % based on the liquid crystal composition D to obtain a liquid crystal composition D1.

Example 6-2

Production Example (4) of Optical Element

A cell was prepared in the same manner as in Example 3-2 except that the space between the supports was adjusted to 4.7 μm. Into such a cell, the liquid crystal composition D1 obtained in Example 6-1 was injected at 70° C. Then, photopolymerization was conducted under the irradiation with ultraviolet light having an intensity of 60 mW/cm$^2$ at 70° C. so that the total amount of light was 4,500 mJ/cm$^2$, whereby a layer of an optical anisotropic material was formed to obtain an optical element D. The optical anisotropic material was horizontally aligned in the rubbing direction of the substrate. Such an optical element D was transparent in the visible range and no scattering was observed. Further, Δn against laser light having a wavelength of 589 nm was 0.051.

Example 6-3

Evaluation Example (4) of Optical Element

The optical element D obtained in Example 6-2 was subjected to an accelerated exposure test by blue laser light in the same manner as in Example 3-3 except that the total exposure energy was 50 W·hour/mm$^2$. As a result, the decrease in Δn after the accelerated test relative to Δn before the test was less than 1%, and the optical element D was found to be excellent in durability against blue laser light.

Example 7

Example 7-1

Formulation Example (5) of Liquid Crystal Composition 0.5 mass % of a polymerizable light stabilizer (manufactured by ASAHI DENKA CO., LTD., product ID number: LA-82) was added to the liquid crystal composition B obtained in Example 4-1 to prepare a liquid crystal composition E. The liquid crystal composition E showed a nematic phase in a range of from room temperature to a super cooling state. Further, the phase transition temperature from the nematic phase to an isotropic phase was at least 200° C.

Then, 0.5 mass % of a photopolymerization initiator was added to the liquid crystal composition E to obtain a liquid crystal composition E1.

Example 7-2

Production Example (5) of Optical Element

A cell was prepared in the same manner as in Example 3-2 except that the space between the supports was adjusted to 4.7 μm. In such a cell, the liquid crystal composition E1 obtained in Example 7-1 was injected at 70° C. Then, photopolymerization was conducted under the irradiation with ultraviolet light having an intensity of 60 mW/cm$^2$ at 70° C. so that the total amount of light was 4,500 mJ/cm$^2$, whereby a layer of an optical anisotropic material was formed to obtain an optical element E. The optical anisotropic material was horizontally aligned in the rubbing direction of the substrate. Such an optical element E was transparent in the visible range and no scattering was observed. Further, Δn against laser light having a wavelength of 589 nm was 0.06.

Example 7-3

Evaluation Example (5) of Optical Element

The optical element E obtained in Example 7-2 was subjected to an accelerated exposure test by blue laser light in the same manner as in Example 3-3 except that the total exposure energy was 40 W·hour/mm$^2$. As a result, the decrease in Δn after the test relative to Δn before the test was less than 1%, and the optical element E was found to be excellent in durability against blue laser light.

Example 8

Example 8-1

Formulation Example (6) of a Liquid Crystal Composition

The following compound (4a), the following compound (4b), the following compound (4c) and the following compound (4d) were mixed in a ratio (mass ratio) of 1:1:1:1 to prepare a liquid crystal composition F. Then, to the liquid crystal composition F, a photopolymerization initiator was added in an amount of 0.5 mass % based on the liquid crystal composition F to obtain a liquid crystal composition F1.

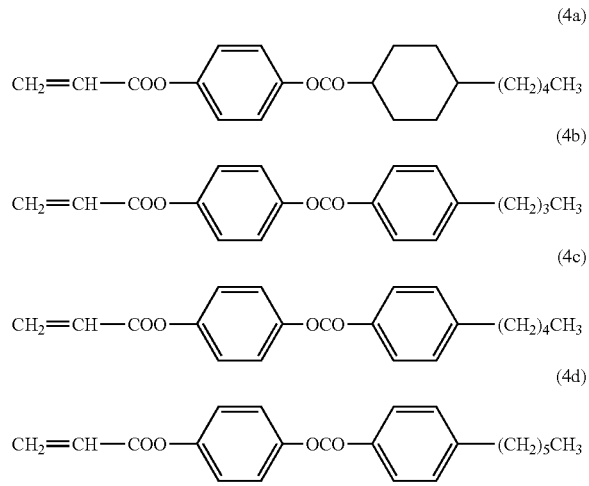

Example 8-2

Production-Evaluation Example (6) of Optical Element

An optical element F was obtained in the same manner as in Example 3-2 except that the liquid crystal composition F1 obtained in Example 8-1 was used. The optical anisotropic material was horizontally aligned in is the rubbing direction. The optical element F was transparent in the visible range and no scattering was observed. Further, Δn against laser light having a wavelength of 589 nm was found to be 0.046.

Then, the optical element F was subjected to an accelerated exposure test by blue laser light in the same manner as in Example 3-3 except that the total exposure energy was 15 W·hour/mm². The rate of decrease in Δn after the accelerated test relative to Δn before the test was 30%. Further, the transmittance of the laser light having a wavelength of 405 nm after the test decreased to 60% of the transmittance before the test.

INDUSTRIAL APPLICABILITY

The optical anisotropic material using the compound (1) of the present invention has high durability against blue laser light and thus is useful as a diffraction element or a phase plate to be used for laser light in such a wavelength zone.

The entire disclosure of Japanese Patent Application No. 2003-291935 filed on Aug. 12, 2003 including specification, claims, drawings and summary is incorporated herein by reference in its entirety.

What is claimed is:

1. A polymerizable liquid crystal compound which is an acrylic acid derivative represented by the following formula (1), provided that the symbols in the formula have the following meanings:
   $R^1$: a hydrogen atom or a methyl group;
   $R^2$: a $C_{1-8}$ alkyl group;
   Cy: a trans-1,4-cyclohexylene group; and
   $X^1$: a 1,4-phenylene group or a trans-1,4-cyclohexylene group;
provided that the above 1,4-phenylene group and the trans-1,4-cyclohexylene group may be such that a hydrogen atom in each group may be substituted by a fluorine atom, a chlorine atom or a methyl group:

2. The polymerizable liquid crystal compound according to claim 1, wherein $R^1$ is a hydrogen atom.

3. A liquid crystal composition comprising two or more polymerizable liquid crystal compounds as defined in claim 1.

4. A liquid crystal composition comprising a polymerizable liquid crystal compound as defined in claim 1 and a polymerizable liquid crystal compound which is an acrylic acid derivative represented by the following formula (2), provided that the symbols in the formula have the following meanings:
   $R^3$: a hydrogen atom or a methyl group;
   Cy: a trans-1,4-cyclohexylene group, provided that a hydrogen atom in the group may be substituted by a fluorine atom, a chlorine atom or a methyl group; and
   $R^4$: a $C_{1-8}$ alkyl group:

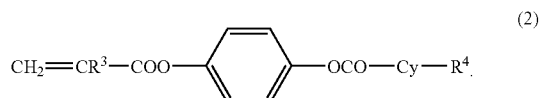

5. A liquid crystal composition comprising a polymerizable liquid crystal compound as defined in claim 1, and a polymerizable liquid crystal compound which is an acrylic acid derivative represented by the following formula (3), provided that the symbols in the formula have the following meanings:

$$CH_2=CR^5-COO-Cy-Cy-R^6 \quad (3)$$

$R^5$: a hydrogen atom or a methyl group;
Cy: a trans-1,4-cyclohexylene group, provided that a hydrogen atom in the group may be substituted by a fluorine atom, a chlorine atom or a methyl group; and
$R^6$: a $C_{1-8}$ alkyl group.

6. The liquid crystal composition according to claim 3, wherein the total content of the polymerizable liquid crystal compounds is from 25 to 100 mass %, based on the entire liquid crystal composition.

7. An optical anisotropic material obtained by polymerizing the liquid crystal composition as defined in claim 3 in an aligned state under irradiation of ultraviolet light or visible light.

8. An optical element made of the optical anisotropic material as defined in claim 7.

9. The optical element according to claim 8, which is a diffraction element.

10. The optical element according to claim 8, which is a phase plate.

* * * * *